United States Patent
Sun et al.

(10) Patent No.: US 11,722,252 B2
(45) Date of Patent: Aug. 8, 2023

(54) BLUETOOTH COMMUNICATION DEVICE AND DATA TRANSMISSION METHOD

(71) Applicant: REALTEK SEMICONDUCTOR CORPORATION, Hsinchu (TW)

(72) Inventors: Huan Sun, Suzhou (CN); Xiao-Dan Xu, Suzhou (CN); Si-Yuan Wang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/670,542

(22) Filed: Feb. 14, 2022

(65) Prior Publication Data
US 2022/0385400 A1 Dec. 1, 2022

(30) Foreign Application Priority Data
May 25, 2021 (CN) .......................... 202110571544.3

(51) Int. Cl.
- H04L 1/08 (2006.01)
- G06F 8/65 (2018.01)
- H04W 4/80 (2018.01)

(52) U.S. Cl.
CPC .............. *H04L 1/08* (2013.01); *G06F 8/65* (2013.01); *H04W 4/80* (2018.02)

(58) Field of Classification Search
CPC .................................... H04L 1/08; H04W 4/80
See application file for complete search history.

(56) References Cited

U.S. PATENT DOCUMENTS

| | | |
|---|---|---|
| 2003/0012212 A1 | 1/2003 | Earnshaw et al. |
| 2005/0286440 A1 | 12/2005 | Strutt et al. |
| 2008/0165795 A1* | 7/2008 | Baruch ............... H04L 49/9094 370/421 |
| 2023/0052957 A1* | 2/2023 | Lee ......................... H02J 50/20 |

OTHER PUBLICATIONS

OA letter of the counterpart TW application ((appl. No. 110122610) mailed on Dec. 30, 2021. summary or the OA letter: 1. Claims 1-10 are rejected as allegedly being unpatentable in view of cited reference 1 (US 2005/0286440 A1) and cited reference 2 (US 2003/0012212 A1). Correspondence bewteen claims of TW counterpart application and claims of US application: 1. Claims 1-9 and 10 in TW counterpart application correspond to claims 1-9 and 11 in US application, respectively.

* cited by examiner

*Primary Examiner* — David Bilodeau
(74) *Attorney, Agent, or Firm* — WPAT, P.C.

(57) ABSTRACT

A data transmission method includes: starting transferring chunks in a first data block of an image file to a device via a Bluetooth network; when a number of at least one first trunk in the chunks that has been transferred to the device equals to a transfer window, determining whether the device receives all of the at least one first trunk to update the chunk missing data; if the device receives all of the at least one first trunk, dynamically adjusting the transfer window according to the chunk missing data to continue transferring remaining chunks in the chunks or a second data block of the image file to the device; and if the device fails to receive all of the at least one first trunk, retransferring at least one chunk that is not previously received by the first device to the device.

20 Claims, 8 Drawing Sheets

BLUETOOTH COMMUNICATION DEVICE AND DATA TRANSMISSION METHOD

BACKGROUND OF THE INVENTION

1. Field of the Invention

The present disclosure relates to a Bluetooth communication device, especially a Bluetooth communication device and a data transmission method that perform a firmware updating process in a Bluetooth mesh network system.

2. Description of Related Art

Existing Bluetooth communication devices may transfer data or image files via Bluetooth network with each other, in order to update firmware. However, during a process of transferring the image file, if a number of issuing requests for asking whether a device to be updated receives data correctly is too high, or if a number of retransferring data is too high, the overall time for updating firmware will be greatly increased.

SUMMARY OF THE INVENTION

In some aspects of the present disclosure, a Bluetooth communication device includes a wireless transceiver circuit, at least one memory circuit, and at least one processor circuit. The wireless transceiver circuit is configured to be coupled to a first device via a Bluetooth network. The at least one memory circuit is configured to store a program code and chunk missing data. The at least one processor circuit is configured to execute the program code to: start transferring a plurality of chunks in a first data block of an image file to the first device; when a number of at least one first trunk in the plurality of chunks that has been transferred to the first device is not less than a transfer window, determine whether the first device receives all of the at least one first trunk, in order to update the chunk missing data; if the first device receives all of the at least one first trunk, dynamically adjust the transfer window according to the chunk missing data, in order to continue transferring remaining chunks in the plurality of chunks or a second data block of the image file to the first device; and if the first device fails to receive all of the at least one first trunk, retransfer at least one second chunk to the first device, wherein the at least one second chunk is a chunk in the at least one first chunk that is not received by the first device.

In some aspects of the present disclosure, a data transmission method includes the following operations: starting transferring a plurality of chunks in a first data block of an image file to a first device via a Bluetooth network; when a number of at least one first trunk in the plurality of chunks that has been transferred to the first device equals to a transfer window, determining whether the first device receives all of the at least one first trunk, in order to update the chunk missing data; if the first device receives all of the at least one first trunk, dynamically adjusting the transfer window according to the chunk missing data, in order to continue transferring remaining chunks in the plurality of chunks or a second data block of the image file to the first device; and if the first device fails to receive all of the at least one first trunk, retransferring at least one second chunk to the first device, in which the at least one second chunk is a chunk in the at least one first chunk that is not received by the first device.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1A:
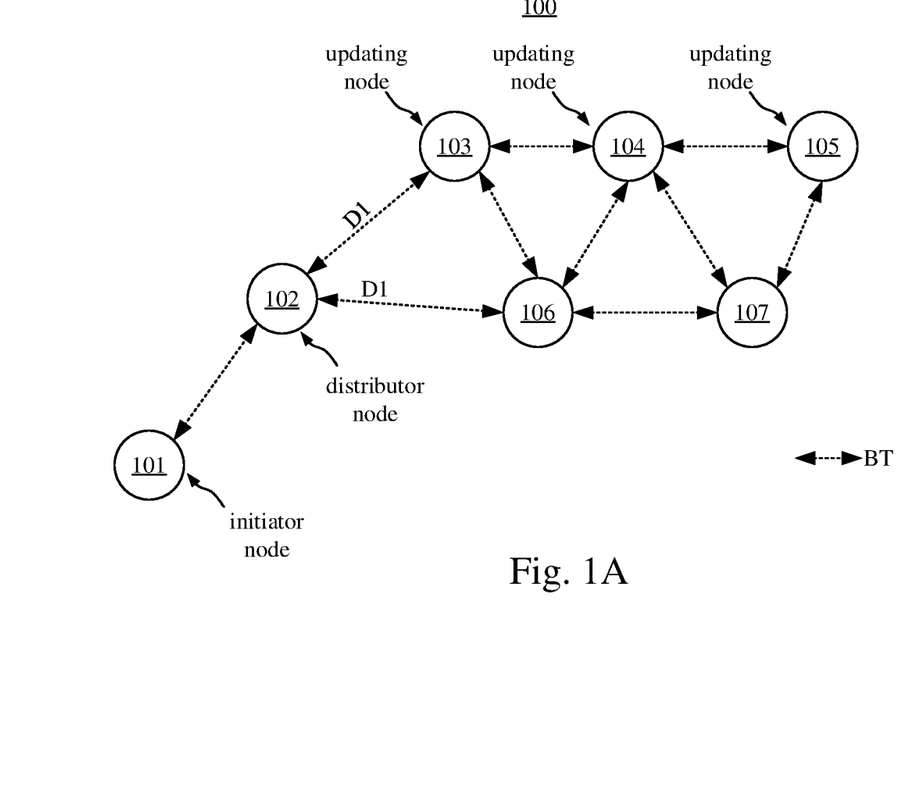
FIG. 1A is a schematic diagram of a network system according to some embodiments of the present disclosure.

FIG. 1A is a schematic diagram of a network system 100 according to some embodiments of the present disclosure. The network system 100 includes electronic devices 101-107. In some embodiments, the electronic devices 101-107 are coupled to each other via a Bluetooth network BT (connections are shown with dotted lines), in order to transfer data and/or commands with each other. In some embodiments, each of the electronic devices 101-107 may be a device that supports a Bluetooth low energy (BLE) technology. For example, each of the electronic devices 101-107 (e.g., the electronic device 102) may be a Bluetooth communication device 400 in FIG. 4. In some embodiments, the Bluetooth network BT may be a Bluetooth mesh network.

Figure 1B:
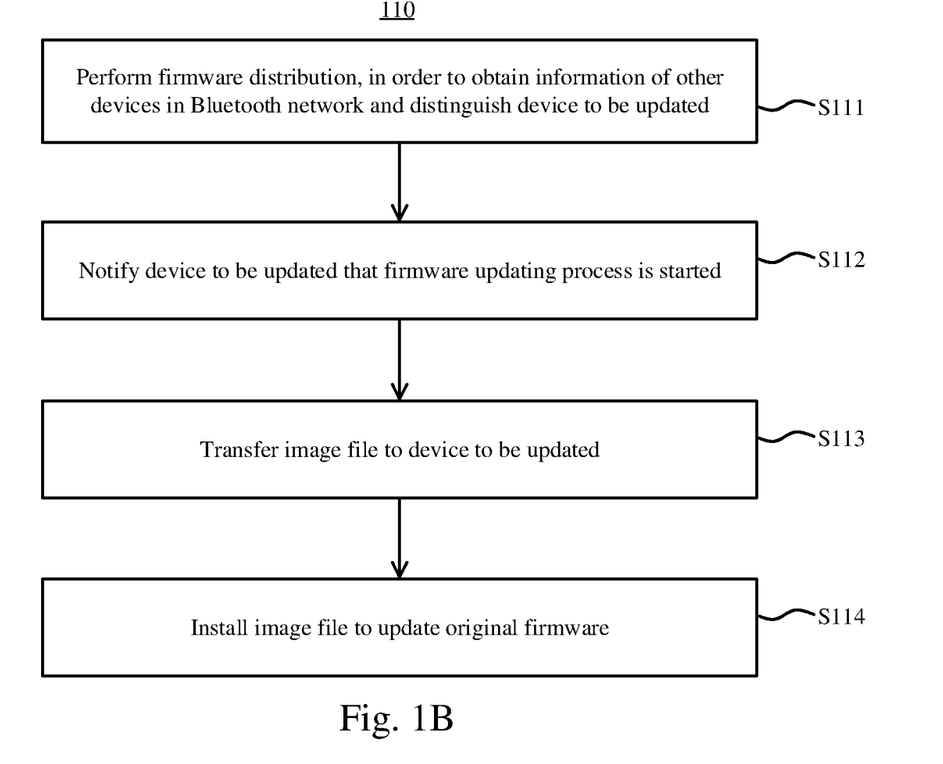
FIG. 1B is a flowchart of a firmware updating method according to some embodiments of the present disclosure.

FIG. 1B is a flowchart of a firmware updating method 110 according to some embodiments of the present disclosure. The firmware updating method 110 can be performed by the network system 100 in FIG. 1A. In some embodiments, the network system 100 may perform a device firmware update (DFU) process according to a standard of a Bluetooth mesh network mode version 1.0.1 (or its successor version) defined by a Bluetooth Special Interest Group (SIG), in which the specification of the above mentioned standard is published on Jul. 13, 2017. For example, the network system 100 may perform the firmware updating method 110 according to a firmware distribution model, a firmware update model, and a binary large object transfer model defined in a R06 draft published on May 29, 2020 and by the Bluetooth SIG.

In operation S111, a firmware distribution is performed, in order to obtain information of other devices in Bluetooth network and distinguish an electronic device whose firmware needs to be updated (hereinafter referred to as "device to be updated"). For example, the electronic device 101 in FIG. 1A may operate as an initiator node, and the electronic device 102 may operate as a distributor node. The electronic device 101 may perform the firmware distribution with the firmware distribution model, in order to obtain device information and firmware version of other nodes (e.g., electronic devices 103-107) in the Bluetooth network BT via the electronic device 102. In this example, the electronic device 101 determines that the firmware of the electronic devices 103-105 are required to be updated according to the firmware version of each of the electronic devices 103-107, and thus the electronic device 101 considers the electronic devices 103-107 (i.e., devices to be updated) as updating nodes, and the remaining electronic device 106-107 are not devices to be updated. In some embodiments, the electronic device 101 may directly transmit an image file D1 (as shown in FIG. 1A) that includes new firmware to the electronic device 102 with the firmware distribution model. In some embodiments, the electronic device 101 may transmit information regarding a specific link to the electronic device 102 with the firmware distribution model, and the electronic device 102 may access the specific link via Internet to obtain the image file D1.

In operation S112, the device to be updated is notified that a firmware updating process is started. For example, the electronic device 102 may notify the electronic devices 103-105 that the firmware updating process is started with the firmware updating model.

Figure 1C:
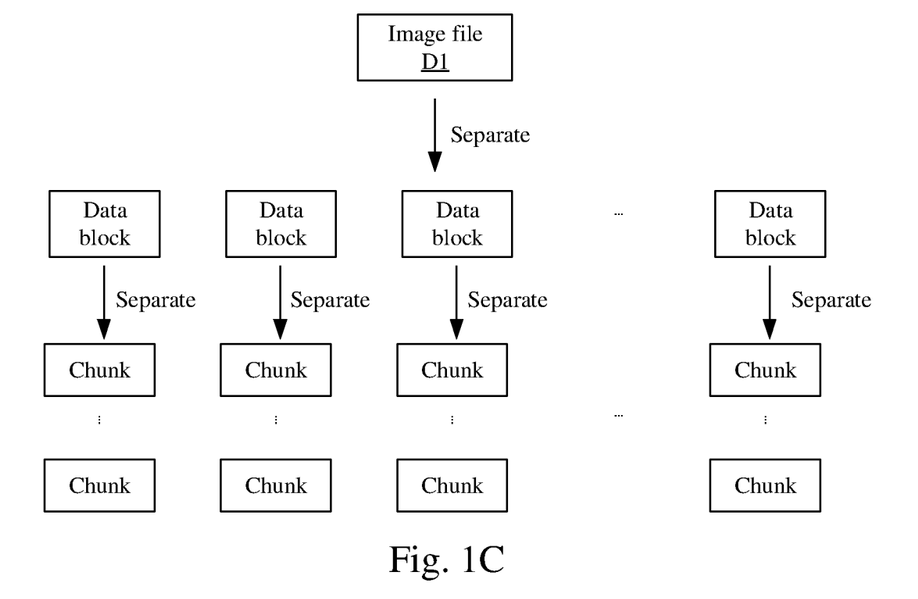
FIG. 1C is a schematic diagram illustrating a separation of the image file according to some embodiments of the present disclosure.

In operation S113, the image file is transferred to the device to be updated. In operation S114, the image file is installed to update the original firmware. For example, the electronic device 102 may determine transmission ability of the electronic devices 103-105 with the binary large object transfer model, in order to determine a size of a data block, a number of data blocks (hereinafter referred to as "value M"), a size of a chunk, and a number of chunks (hereinafter referred to as "value N") to be used during transmission. Reference is made to FIG. 1C, and FIG. 1C is a schematic diagram illustrating a separation of the image file D1 according to some embodiments of the present disclosure. In some embodiments, the electronic device 102 may separate the image file D1 into M data blocks according to the size of the data block, and separate each data block into N chunks according to the size of the chunk, in which each of the value M and the value N is a positive integer greater than 1, and a minimum transfer unit for transferring the image file D1 is one chunk. With the binary large object transfer model, the electronic device 102 may transfer the N chunks belonging to the same data block to the device to be updated. After the electronic device 102 checks that the devices to be updated correctly receive all chunks of that data block, the electronic device 102 may start transferring chunks of a next data block to the device to be updated. By repeatedly performing the above operations, the device to be updated may install the image file D1 after all data blocks of the image file D1 are received, in order to update the firmware thereof. The arrangements regarding operation S113 will be provided with reference to FIG. 2 or FIG. 3A.

Detailed operations about the firmware distribution model, the firmware updating model, and the binary large object transfer model can be understood with reference to the specification of the related communication standard, and thus the repetitious descriptions are not further given. In some embodiments, the electronic device 102 may perform a data transmission method 200 in FIG. 2 in a push mode, in order to transfer the image file D1 to device(s) to be updated. As a result, it is able to transfer the image file D1, and assure that the data integrity of the image file D1 received by the device(s) to be updated can be kept, in order to shorten the overall time for updating firmware. Moreover, the number of electronic devices (which are 7 devices) in FIG. 1A is given for illustrative purposes, and the present disclosure is not limited thereto.

Figure 2:
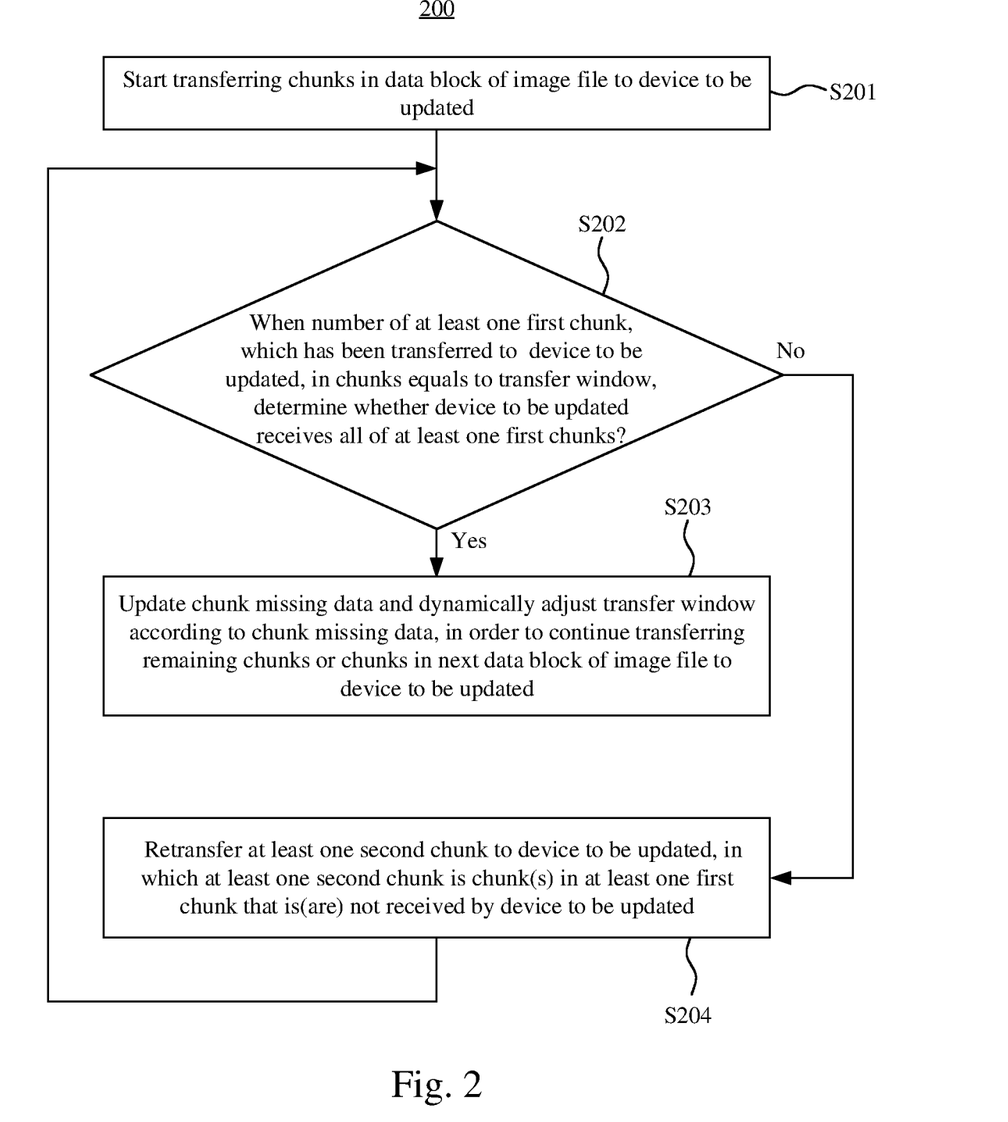
FIG. 2 is a flowchart of the data transmission method according to some embodiments of the present disclosure.

FIG. 2 is a flowchart of the data transmission method 200 according to some embodiments of the present disclosure. In some embodiments, the data transmission method 200 may be performed by the electronic device 102 in FIG. 1A. In some embodiments, the data transmission method 200 is equivalent to operation S113 in FIG. 1B.

In operation S201, chunks in a data block of the image file are started transferring to a device to be updated. In operation S202, when a number of at least one first chunk, which has been transferred to the device to be updated, in the chunks equals to a transfer window (e.g., the transfer window W in FIG. 4), whether the device to be updated receives all of the at least one first chunks is determined. If the device to be updated receives all of the at least one first chunk, operation S203 is performed. Alternatively, if the device to be updated fails to receive all of the at least one first chunk, operation S204 is performed. In operation S203, chunk missing data (e.g., the chunk missing data DM) is updated, and the transfer window is dynamically adjusted according to the chunk missing data, in order to continue transferring remaining chunks in the chunks or chunks in a next data block of the image file to the device to be updated. In operation S204, at least one second chunk is retransferred to the device to be updated, in which the at least one second chunk is chunk(s) in the at least one first chunk that is(are) not received by the device to be updated.

The above description of the data transmission method 200 includes exemplary operations, but the operations of the data transmission method 200 are not necessarily performed in the order described above. Operations of the data transmission method 200 can be added, replaced, changed order, and/or eliminated, or the operations of the data transmission method 200 can be executed simultaneously or partially simultaneously as appropriate, in accordance with the spirit and scope of various embodiments of the present disclosure.

Figure 3A:
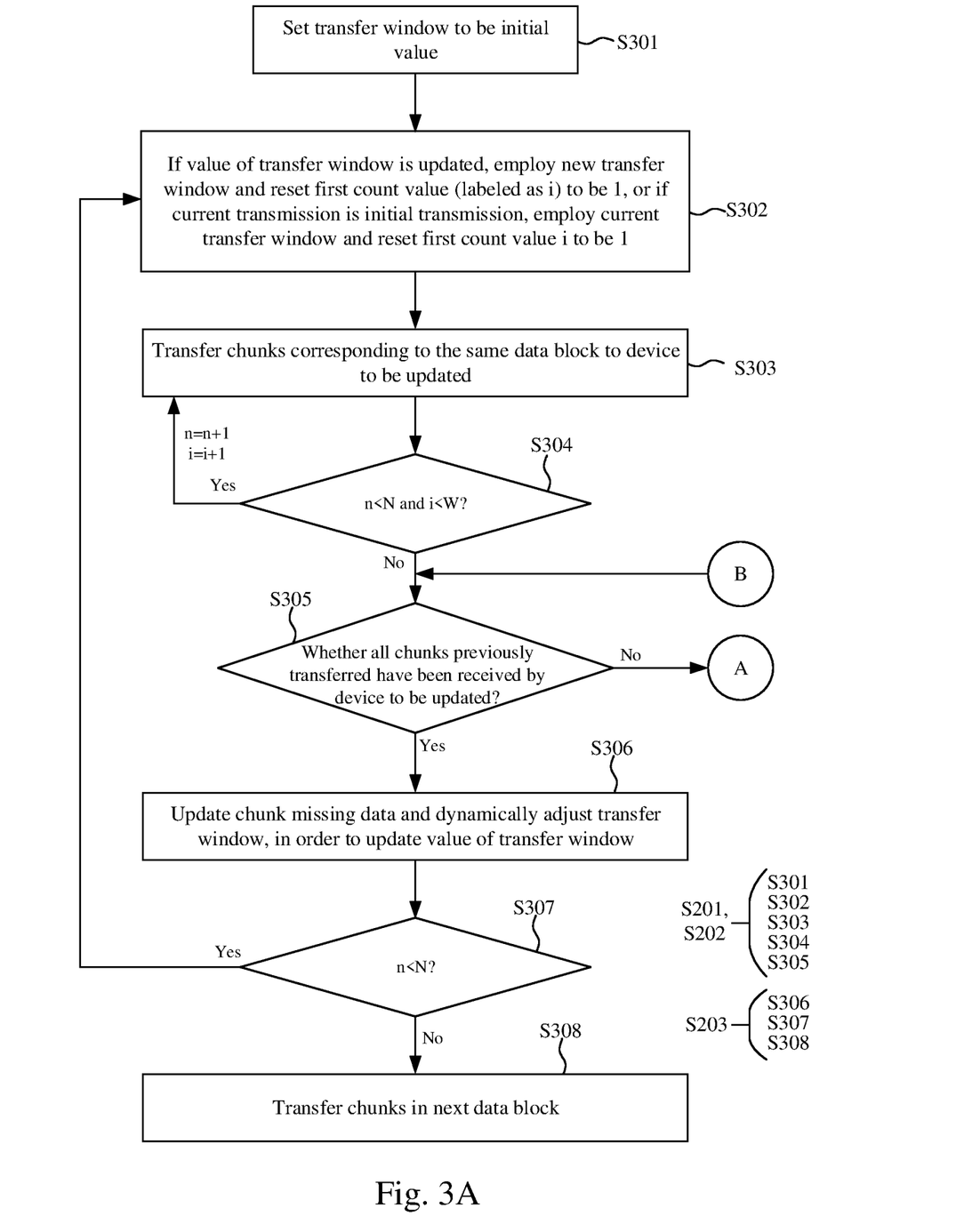
FIG. 3A and FIG. 3B are a flowchart of steps corresponding to operations in FIG. 2 according to some embodiments of the present disclosure.
Figure 3B:
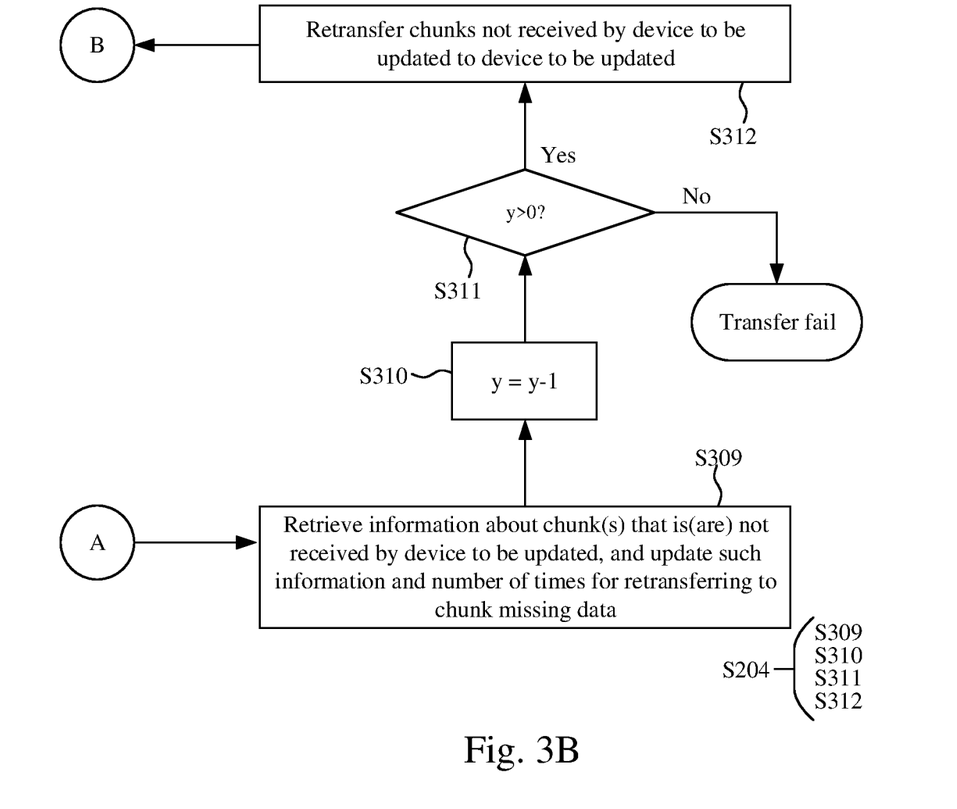

In order to further illustrate the data transmission method 200, reference is made to FIG. 3A and FIG. 3B, and FIG. 3A and FIG. 3B are a flowchart of steps corresponding to operations in FIG. 2 according to some embodiments of the present disclosure. FIG. 3A and FIG. 3B include steps S301-S312. In FIG. 3A, steps S301-S305 correspond to operation S201 and operation S202 in FIG. 2, and steps S306-S308 correspond to operation S203 in FIG. 2. In FIG. 3B, steps S309-S312 correspond to operation S204 in FIG. 2.

Figure 4:
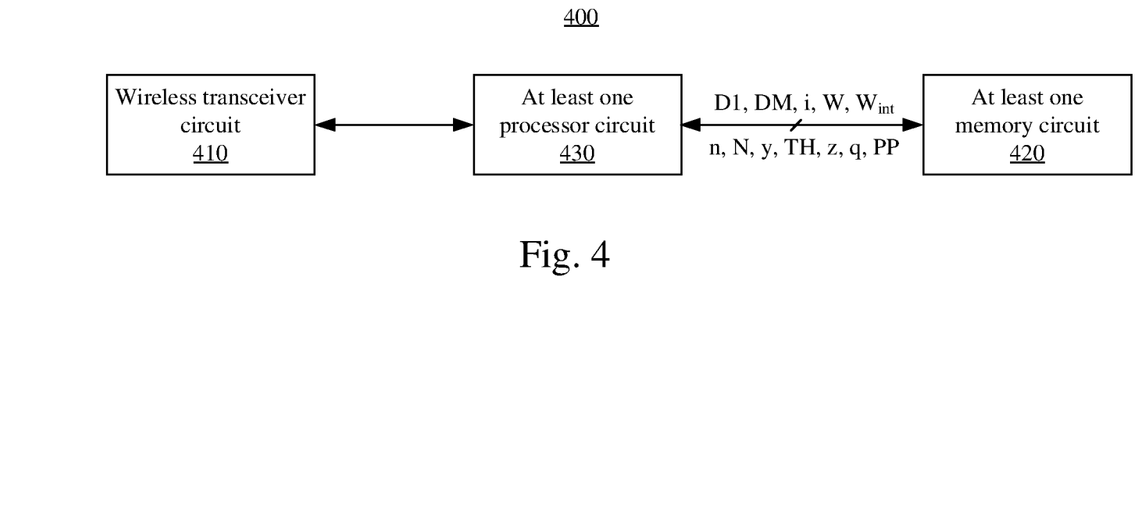
FIG. 4 is a schematic diagram of a Bluetooth communication device according to some embodiments of the present disclosure.

In step S301, the transfer window is set to be an initial value (e.g., an initial value $W_{int}$ in FIG. 4). In some embodiments, before starting transferring the image file D1, the electronic device 102 may determine the initial value $W_{int}$ of the transfer window W, in which the transfer window W indicates a number of chunks can be transferred in one transferring period. In some embodiments, the transferring period is an interval from starting transferring i chunks to determining whether the device to be updated receives the i chunks. For example, if the initial value $W_{int}$ of the transfer window W is 3, in one transferring period, the electronic device 102 can transfer 3 chunks in a row, and determine whether the device to be updated receives those 3 chunks.

In step S302, if a value of the transfer window is updated, the new transfer window is employed and a first count value (labeled as i) is reset to be 1, or if the current transmission is an initial transmission, a current transfer window is employed and the first count value i is reset to be 1. For example, if the electronic device 102 updates the transfer window W after performing step S306, the electronic device 102 employs the updated transfer window W to transfer the remaining chunks, and increases the first count value i by 1. Alternatively, if the current transmission is an initial transmission (e.g., transferring a first chunk of the image file D1), the electronic device 102 may employ the transfer window W having the initial value $W_{int}$ to start transferring chunks, and set the first count value i to be 1.

In step S303, chunks corresponding to the same data block are transferred to the device to be updated. In step S304, whether a number (labeled as "value n") of chunks have been transferred (i.e., the aforementioned at least one first chunk is less than the value N (labeled as "n<N") is determined, and whether the current first count value i is less than the transfer window (labeled as "i<W") is determined. If the number of the chunks have been transferred is less than the value N and the first count value i is less than the transfer window W, the value n is updated to be n+1, the first count value i is updated to be i+1, and step S303 is performed to continue transferring chunks. If the number of chunks have been transferred is not less than the value N or the first count value is not less than the transfer window, step S305 is performed.

As mentioned above, each data block in the image file D1 can be separated into N chunks, and thus the value N is the number of all chunks included in one data block. In an example, the value N is 5, and the current transmission is an initial transmission, and thus the first count value i is 1 and the value of the transfer window W is the initial value $W_{int}$ (e.g., 5). The electronic device 102 may transfer a first chunk in a first data block of the image file D1 to the device to be updated (i.e., step S303). After the first data block is transferred, the electronic device 102 determines that the number of chunk(s) have been transferred is 1 (i.e., n=1), and that the value n is less than the value N (i.e., 1<5) and the first count value i is less than the transfer window W (i.e., 1<5) as well (i.e., step S304). Under this condition, the electronic device 102 updates the value n to be n+1, updates the first count value i to be i+1, and performs step S302 again, in order to continue transferring a second chunk of the first data block to the device to be updated. By repeatedly performing the above steps, After the electronic device 102 transmits the fifth chunk, the electronic device 102 determines that the number of chunks have been transmitted is 5 (i.e., n=5) and the value n is not less than 5 (i.e., 5≥5). Under this condition, it indicates that the electronic device 102 have transmitted all chunks in the first data block to the device to be updated, and thus the electronic device 102 may perform step S305.

Alternatively, in another example, the value N is 5, the current transmission is an initial transmission, and thus the first count value i is 1 and the value of the transfer window W is the initial value $W_{int}$ (e.g., 3). After the electronic device 102 transmits the third chunk, the electronic device 102 determines that the number of chunks have been transferred is 3 (i.e., n=3), the value n is not less than the value N (i.e., 3 is not less than 5), and the first count value i is not less than the transfer window W (i.e., 3≥3; step S304). Under this condition, it indicates that the electronic device 102 has reached the maximum number of chunks can be transferred in a single transferring period, and thus the electronic device 102 may perform step S305.

In step S305, whether all chunks previously transferred have been received by the device to be updated is determined. If the device to be updated received all chunks which are previously transferred, step S306 is performed. Alternatively, if the device to be updated did not receive all chunks which are previously transferred, step S309 in FIG. 3B is performed. For example, with step S301 to step S304, the electronic device 102 may transfer 3 chunks in the first data block to the device to be updated (e.g., the electronic device 103). After 3 chunks are transferred, the electronic device 102 may issue a request to ask if the electronic device has correctly received those 3 chunks. If the electronic device 103 responds that all 3 chunks have been received, the electronic device 102 may update the chunk missing data DM and perform step S306. Alternatively, if the electronic device 103 responds that at least one of the 3 chunks is not received (i.e., the at least one second chunk), the electronic device 102 may perform step S309.

In step S306, the chunk missing data are updated, and the transfer window is dynamically adjusted, in order to update the value of the transfer window. Step S306 will be described with reference to FIG. 3C, and is thus not repeated here. In step S307, whether the value n is less than the value N is determined. If the value n is less than the value N, step S302 is performed. Alternatively, if the value n is not less than the value N, step S308 is performed. In step S308, chunks in a next data block is started transferring.

As mentioned above, a single data block of the image file D1 can be separated into N chunks. If the value n is less than the value N, it indicates that there are remaining chunks in the currently transmitted data block have not been transferred, and thus the electronic device 102 performs step S302 to continue transferring the remaining chunks based on the updated transfer window W. Alternatively, if the value n is not less than the value N, it indicates that the currently transferred data block has been entirely transferred, and thus the electronic device 102 performs step S308 to continue transferring a next data block in the image file D1 based on the updated transfer window W.

With continued to FIG. 3B, in step S309, information about chunk(s) that are not received by the device to be updated are retrieved, and such information and the number of times for retransferring are updated to the chunk missing data. For example, if the electronic device 103 responds that the first chunk and the third chunk are not received and the electronic device 104 responds that the second chunk is not received, the electronic device 102 may record the above information and the number of number of times for retransferring those chunks to the corresponding electronic device as the chunk missing data DM.

In step S310, 1 is subtracted from a second count value (labeled as y) (i.e., y=y−1). The second count value y is an upper limit of the number of times for retransferring. In step S311, whether the second count value is greater than 0 is determined (labeled as y>0). If the second count value y is greater than 0, it indicates that the number of times for retransferring does not reach the upper limit, and thus step S312 can be performed. Alternatively, if the second count value y is not greater than 0, it indicates that the number of times for retransferring reached the upper limit, and the current transfer failed. In step S312, chunks not received by the device to be updated are retransferred to the device to be updated, and step S305 in FIG. 3A is performed.

With repeatedly performing steps in FIG. 3A and FIG. 3B, the electronic device 102 is able to transfer the image file D1 to the electronic devices 103-150 more efficiently. As a result, the electronic devices 103-105 are able to receive and install the image file D1, in order to update the firmware thereof.

Figure 3C:
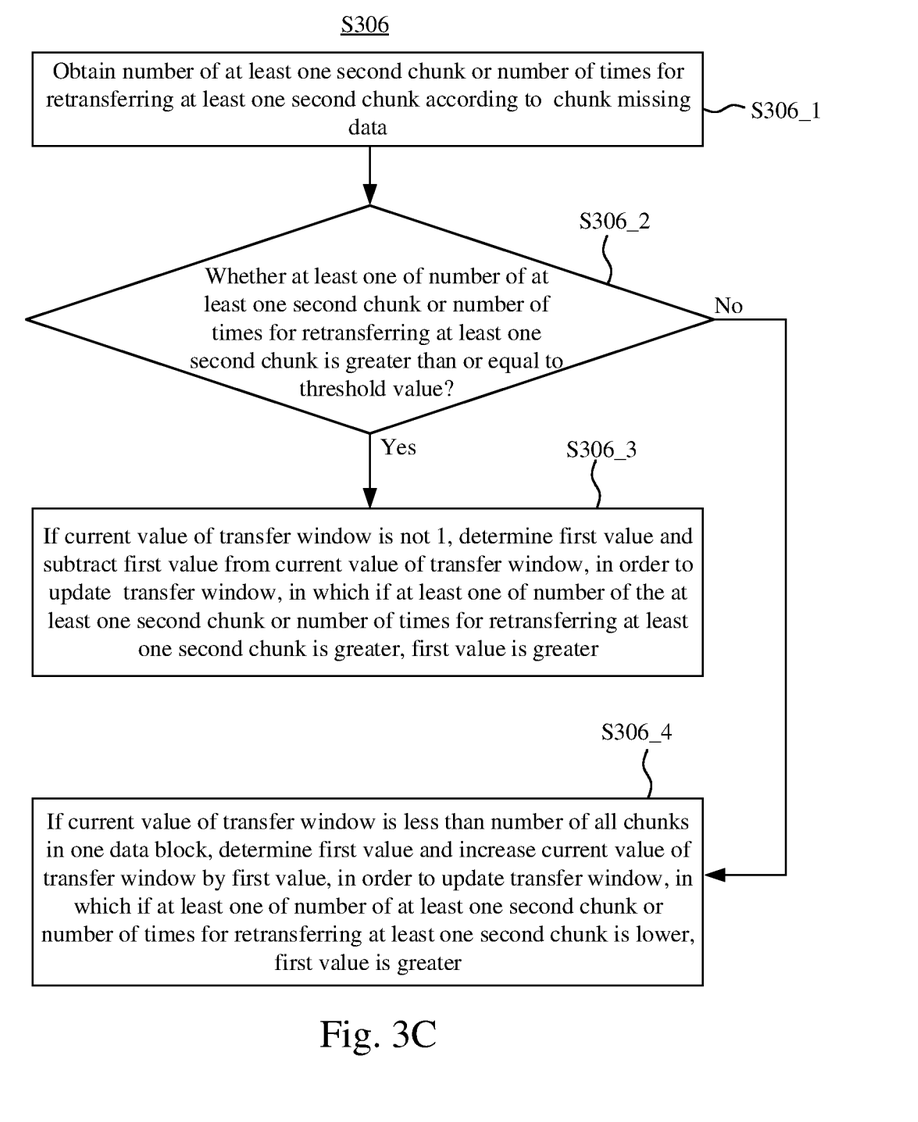
FIG. 3C is a flow chart of a step in FIG. 3A according to some embodiments of the present disclosure.

FIG. 3C is a flow hart of step 306 in FIG. 3A according to some embodiments of the present disclosure. In some embodiments, step S306 in FIG. 3A includes sub-steps S306_1-S306_4.

In step S306_1, the number of the at least one second chunk or the number of times for retransferring the at least one second chunk is obtained according to the chunk missing data. The at least one second chunk is chunk(s) is(are) retransferred in step S312 (i.e., chunk(s) is(are) which are not received by the device to be updated and is(are) thus recorded in step S309).

In sub-step S306_2, whether at least one of the number of the at least one second chunk or the number of times for retransferring the at least one second chunk is greater than or equal to a threshold value is determined. If the number of the at least one second chunk or the number of times for retransferring the at least one second chunk is greater than or equal to the threshold value, sub-step S306_3 is performed. Alternatively, if the number of the at least one second chunk or the number of times for retransferring the at least one second chunk is less than the threshold value, sub-step S306_4 is performed.

In sub-step S306_3, if the current value of the transfer window is not 1, a first value is determined and the first value is subtracted from the current value of the transfer window, in order to update the transfer window, in which if at least one of the number of the at least one second chunk or the number of times for retransferring the at least one second chunk is greater, the first value is greater.

For example, if the number of the at least one second chunk is greater than or equal to the threshold value (e.g., a threshold value TH in FIG. 4), the electronic device 102 may determine that the transmission quality of the Bluetooth network BT is poor, and thus set a greater first value (e.g., the value z in FIG. 4). The electronic device 102 may subtract the value z from the current value of the transfer window W. In other words, when the transmission quality of the Bluetooth network BT is poor, the electronic device 102 is able to dynamically decrease the transfer window W, in order to increase the number of times for performing step S305 in FIG. 3A to assure the chunk transfer success rate.

In sub-step S306_4, if the current value of the transfer window is less than the number of all chunks in one data block (i.e., the value N), the first value is determined and the current value of the transfer window is increased by the first value (e.g., the value z in FIG. 4), in order to update the transfer window, in which if at least one of the number of the at least one second chunk or the number of times for retransferring the at least one second chunk is lower, the first value is greater.

For example, if the number of the at least one second chunk is less than the threshold value is less than the threshold value TH, the electronic device 102 may determine the transmission quality of the Bluetooth network BT is stable, and thus set a greater value z. The electronic device 102 may add the value z to the current value of the transfer window W. In other words, when transmission quality of the Bluetooth network BT is good, the electronic device 102 may dynamically increase the transfer window W, in order to reduce the number of times of performing step S305 in FIG. 3A to improve the efficiency of data transmission.

For illustrative purposes, the above examples are given with the number of the at least one second chunk, but the present disclosure is not limited thereto. In other embodiments, the electronic device 102 may compare the number of times for retransferring the at least one second chunk with the threshold value TH to adjust the transfer window W. Alternatively, the electronic device 102 may adjust the transfer window W according to both of the number of the at least one second chunk and the number of times for retransferring the at least one second chunk. For example, in some other embodiments, the electronic device 102 may compare a sum of the number of the at least one second chunk and the number of times for retransferring the at least one second chunk with the threshold value TH, in order to adjust the transfer window W.

Figure 3D:
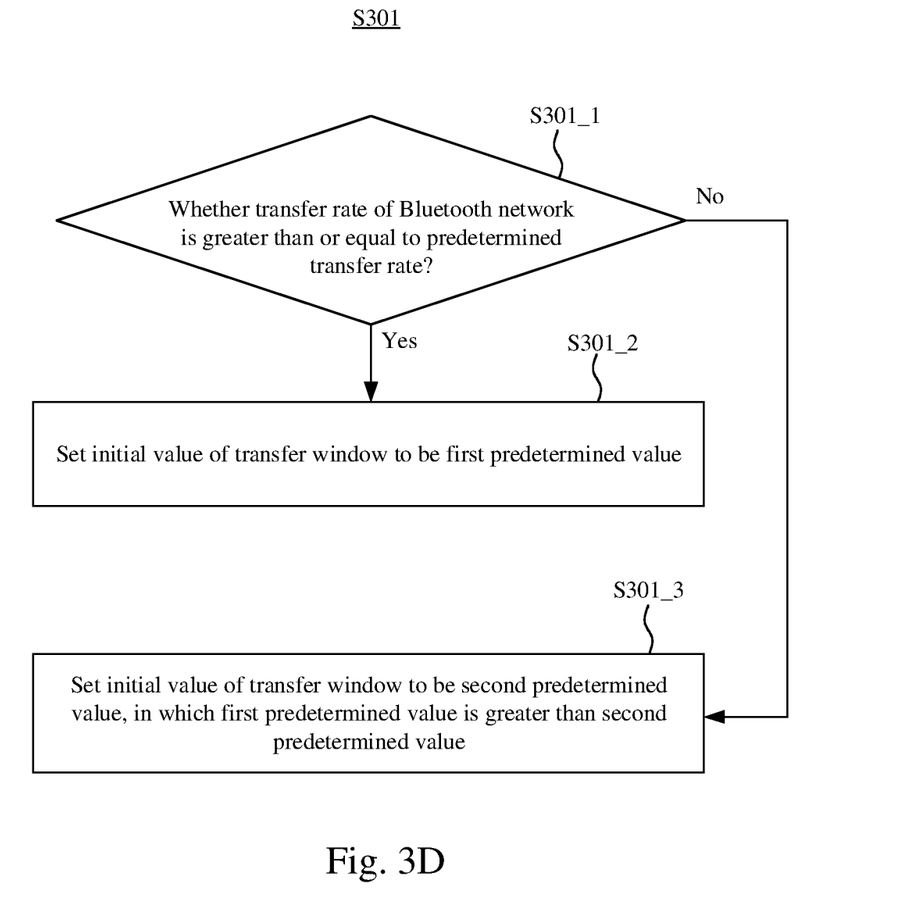
FIG. 3D is a flowchart of a step in FIG. 3A according to some embodiments of the present disclosure.

FIG. 3D is a flowchart of step S301 in FIG. 3A according to some embodiments of the present disclosure. In some embodiments, step S301 includes sub-steps S301_1-S301_3.

In sub-step S301_1, whether a transfer rate of the Bluetooth network is greater than or equal to a predetermined transfer rate is determined. If the transfer rate of the Bluetooth network is greater than or equal to the predetermined transfer rate, sub-step S301_2 is performed. Alternatively, if the transfer rate of the Bluetooth network is less than the predetermined transfer rate, sub-step S301_3 is performed.

In sub-step S301_2, the initial value of the transfer window is set to be a first predetermined value. In sub-step S301_3, the initial value of the transfer window is set to be a second predetermined value, in which the first predetermined value is greater than the second predetermined value. For example, before transferring chunks, the electronic device 102 may obtain related information about the current environment via an application layer, in order to determine whether the transfer rate of the Bluetooth network BT is greater than or equal to the predetermined transfer rate (e.g., a predetermined transfer rate q in FIG. 4). If the transfer rate of the Bluetooth network BT is greater than or equal to the predetermined transfer rate q, it indicates that the current transmission quality of the Bluetooth network BT is stable, and thus the electronic device 102 may set the initial value $W_{int}$ of the transfer window W to be the first predetermined value (which has a greater value). In some embodiments, the first predetermined value may be the number of all chunks in a single data block (i.e., the value N). As a result, the electronic device 102 is able to attempt to transfer chunks at maximum efficiency.

Alternatively, if the transfer rate of the Bluetooth network BT is lower than the predetermined transfer rate q, it indicates that the current transmission quality of the Bluetooth network BT is poor, and the electronic device 102 may set the initial value $W_{int}$ of the transfer window W to be the second predetermined value (which has a lower value). In some embodiments, the second predetermined value may be 1. As a result, the electronic device 102 is able to attempt to transfer chunks at the lowest efficiency to improve the success rate of transferring chunks.

With the above arrangements, the electronic device 102 may determine whether to perform a fast boot (i.e., step S301_2) or a soft boot (i.e., step S301_3) of the binary large object transfer model according to the current transmission quality of the Bluetooth network BT.

In some related approaches, after an electronic device transfers one chunk, the electronic device immediately issues a request to ask if the device to be updated receives that chunk. As a result, the success rate of transferring data is kept while the overall transmission time will be greatly increased. In some other related approaches, an electronic device issues a request to ask if the device to be updated receives chunks after the electronic device transfers all chunks in one data block. As a result, if the current transmission quality of the Bluetooth network is poor, the number of chunks not received by the device to be updated may be quite high, which results in more time to retransfer those chunks.

Compared with those approaches, in some embodiments, the electronic device 102 is able to utilize the transfer window W to set a number of chunks transferred in one transmission period, and dynamically adjust the transfer window W according to the transmission quality of the Bluetooth network BT. As a result, the overall transmission time can be effectively reduced, and a certain transfer success rate is kept.

The above description of steps in FIGS. 3A-3D includes exemplary operations, but steps in FIGS. 3A-3D are not necessarily performed in the order described above. Steps in FIGS. 3A-3D can be added, replaced, changed order, and/or eliminated, or steps in FIGS. 3A-3D can be executed simultaneously or partially simultaneously as appropriate, in accordance with the spirit and scope of various embodiments of the present disclosure.

FIG. 4 is a schematic diagram of a Bluetooth communication device 400 according to some embodiments of the present disclosure. In some embodiments the electronic device 102 in FIG. 1A may be implemented with the Bluetooth communication device 400. The Bluetooth communication device 400 includes a wireless transceiver circuit 410, at least one memory circuit 420, and at least one processor circuit 430. The wireless transceiver circuit 410 may be coupled to the electronic devices 101 and 103-107 via the Bluetooth network BT in FIG. 1A, in order to transfer the image file D1 and/or other data or commands. In some embodiments, the wireless transceiver circuit 410 includes a data transmitter circuit (not shown in FIG. 4) and data receiver circuit (not shown in FIG. 4) that support Bluetooth mesh network.

The at least one processor circuit 430 is coupled the wireless transceiver circuit 410 and the at least one memory circuit 420. In various embodiments, the at least one processor circuit 430 may be a central processor unit (CPU), an application-specific integrated circuit (ASIC), a multi-processor, a pipeline processor, a distributed processing system, or the like. Various circuits or units to implement the at least one processor circuit 430 are within the contemplated scope of the present disclosure.

In some embodiments, the at least one memory circuit 420 may be configured to store the image file D1, the chunk missing data DM, and information about the first count value I, the transfer window W, the initial value $W_{int}$, the value n, the value N, the second count value y, the threshold value TH, the value z, and/or the predetermined transfer rate q. In some embodiments, the at least one memory circuit 420 further stores the program code PP. The at least one processor circuit 430 may execute the program code PP stored in the at least one memory circuit 420, in order to update firmware (e.g., operations in FIG. 1B and/or FIG. 2).

In some embodiments, the at least one memory circuit 420 may be a non-transitory computer readable storage medium. In some embodiments, the computer readable medium may be an electronic, magnetic, optical, electromagnetic, infrared, and/or a semiconductor device. For example, the computer readable storage medium includes a semiconductor or solid-state memory, a magnetic tape, a removable computer diskette, a random-access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), and/or a digital video disc (DVD).

The configurations about the Bluetooth communication device 400 are given for illustrative purposes, and the present disclosure is not limited thereto. Various Bluetooth communication devices are within the contemplated scope of the present disclosure.

As described above, the Bluetooth method and the data transmission method in some embodiments of the present disclosure are able to utilize the transfer window to dynamically adjust the transfer efficiency according to the current transmission quality during a process of transferring firmware data to the device to be updated, in order to reduce overall transferring time and keep a certain success transfer rate.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A Bluetooth communication device, comprising:
a wireless transceiver circuit configured to be coupled to a first device via a Bluetooth network;
at least one memory circuit configured to store a program code and chunk missing data; and
at least one processor circuit configured to execute the program code to:
start transferring a plurality of chunks in a first data block of an image file to the first device;
when a number of at least one first trunk in the plurality of chunks that has been transferred to the first device is not less than a transfer window, determine whether the first device receives all of the at least one first trunk, in order to update the chunk missing data;
if the first device receives all of the at least one first trunk, dynamically adjust the transfer window according to the chunk missing data, in order to continue transferring remaining chunks in the plurality of chunks or a second data block of the image file to the first device; and
if the first device fails to receive all of the at least one first trunk, retransfer at least one second chunk to the first device, wherein the at least one second chunk is a chunk in the at least one first chunk that is not received by the first device.

2. The Bluetooth communication device of claim 1, wherein the at least one processor circuit is configured to obtain a number of the at least one second chunk or a number of times for retransferring the at least one second block according to the chunk missing data, and dynamically adjust the transfer window according to at least one of the number of the at least one second chunk or the number of times for retransferring the at least one second block.

3. The Bluetooth communication device of claim 2, wherein if the at least one of the number of the at least one second chunk or the number of times for retransferring the at least one second block is greater than or equal to a threshold value and a current value of the transfer window is not 1, the at least one processor circuit is configured to subtract a first value from the current value of the transfer window, in order to update the transfer window.

4. The Bluetooth communication device of claim 3, wherein if the number of the at least one second chunk or the number of times for retransferring the at least one second block is greater, the first value is greater.

5. The Bluetooth communication device of claim 2, wherein if the at least one of the number of the at least one second chunk or the number of times for retransferring the at least one second block is less than a threshold value and a current value of the transfer window is less than a number of the plurality of chunks, the at least one processor circuit is configured to increase the current value of the transfer window by a first value, in order to update the transfer window.

6. The Bluetooth communication device of claim 5, wherein if the number of the at least one second chunk or the number of times for retransferring the at least one second block is less, the first value is greater.

7. The Bluetooth communication device of claim 1, wherein before the first data block is started transferring, the at least one processor circuit is configured to set an initial value of the transfer window to be a first predetermined value or a second predetermined value according to a transfer rate of the Bluetooth network, and the first predetermined value is greater than the second predetermined value.

8. The Bluetooth communication device of claim 7, wherein when the transfer rate is greater than or equal to a predetermined transfer rate, the at least one processor is configured to set the initial value to be the first predetermined value.

9. The Bluetooth communication device of claim 7, wherein when the transfer rate is lower than a predetermined transfer rate, the at least one processor is configured to set the initial value to be the second predetermined value.

10. The Bluetooth communication device of claim 7, wherein the first predetermined value is a number of the plurality of chunks and the second predetermined value is 1.

11. A data transmission method, comprising:
starting transferring a plurality of chunks in a first data block of an image file to a first device via a Bluetooth network;
when a number of at least one first trunk in the plurality of chunks that has been transferred to the first device equals to a transfer window, determining whether the first device receives all of the at least one first trunk, in order to update the chunk missing data;
if the first device receives all of the at least one first trunk, dynamically adjusting the transfer window according to the chunk missing data, in order to continue transferring remaining chunks in the plurality of chunks or a second data block of the image file to the first device; and
if the first device fails to receive all of the at least one first trunk, retransferring at least one second chunk to the first device, wherein the at least one second chunk is a chunk in the at least one first chunk that is not received by the first device.

12. The data transmission method of claim 11, wherein dynamically adjusting the transfer window according to the chunk missing data, in order to continue transferring remaining chunks in the plurality of chunks or a second data block of the image file to the first device comprises:
dynamically adjusting the transfer window according to at least one of a number of the at least one second chunk or a number of times for retransferring the at least one second block.

13. The data transmission method of claim 12, wherein dynamically adjusting the transfer window according to at least one of the number of the at least one second chunk or the number of times for retransferring the at least one second block comprises:
if the at least one of the number of the at least one second chunk or the number of times for retransferring the at least one second block is greater than or equal to a threshold value and a current value of the transfer window is not 1, subtracting a first value from the current value of the transfer window, in order to update the transfer window.

14. The data transmission method of claim 13, wherein if the number of the at least one second chunk or the number of times for retransferring the at least one second block is greater, the first value is greater.

15. The data transmission method of claim 12, wherein dynamically adjusting the transfer window according to at least one of the number of the at least one second chunk or the number of times for retransferring the at least one second block comprises:
if the at least one of the number of the at least one second chunk or the number of times for retransferring the at least one second block is less than a threshold value and a current value of the transfer window is less than a number of the plurality of chunks, increasing the current value of the transfer window by a first value, in order to update the transfer window.

16. The data transmission method of claim 15, wherein if the number of the at least one second chunk or the number of times for retransferring the at least one second block is less, the first value is greater.

17. The data transmission method of claim 11, further comprising:
  before starting transferring the first data block, setting an initial value of the transfer window to be a first predetermined value or a second predetermined value according to a transfer rate of the Bluetooth network, and the first predetermined value is greater than the second predetermined value.

18. The data transmission method of claim 17, wherein setting the initial value of the transfer window to be the first predetermined value or the second predetermined value according to the transfer rate comprises:
  when the transfer rate is greater than or equal to a predetermined transfer rate, setting the initial value to be the first predetermined value.

19. The data transmission method of claim 17, wherein setting the initial value of the transfer window to be the first predetermined value or the second predetermined value according to the transfer rate comprises:
  when the transfer rate is lower than a predetermined transfer rate, setting the initial value to be the second predetermined value.

20. The data transmission method of claim 17, wherein the first predetermined value is a number of the plurality of chunks, and the second predetermined value is 1.

* * * * *